United States Patent [19]

Scarritt, Sr.

[11] 3,953,726
[45] Apr. 27, 1976

[54] INFINITELY ADJUSTABLE LEVEL LIGHT

[76] Inventor: Frank M. Scarritt, Sr., 1338 Park St. North, St. Petersburg, Fla. 33710

[22] Filed: Dec. 6, 1974

[21] Appl. No.: 530,345

[52] U.S. Cl. .............................. 240/61; 240/41.6; 240/44.2; 313/60; 313/146
[51] Int. Cl.² ................ B60Q 1/06; F21M 3/18; F21V 7/00; F21V 19/02
[58] Field of Search ............... 240/61, 41.6, 44.2; 313/146, 60

[56] References Cited
UNITED STATES PATENTS

| | | | |
|---|---|---|---|
| 2,487,591 | 11/1949 | Ricci | 240/61 X |
| 3,168,986 | 2/1955 | Jeffree et al. | 240/44.2 |
| 3,270,196 | 8/1966 | Foley | 240/44.2 |
| 3,624,386 | 11/1971 | Plumadore | 240/44.2 |

Primary Examiner—Richard A. Wintercorn

[57] ABSTRACT

Headlight lamp units on a vehicle project light beams that are selectively adjustable as to intensity and position within sealed reflector chambers. The lamp filaments are carried on the forward end of an elongated filament assembly pivotally mounted within the housing of each lamp unit. A motor operated adjusting mechanism pivotally displaces the filament assembly by an infinitely variable amount to a desired position.

15 Claims, 11 Drawing Figures

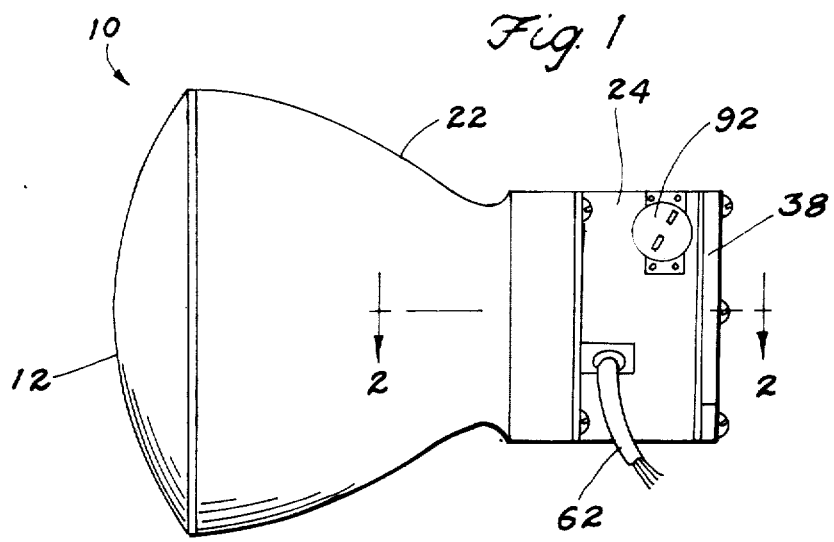
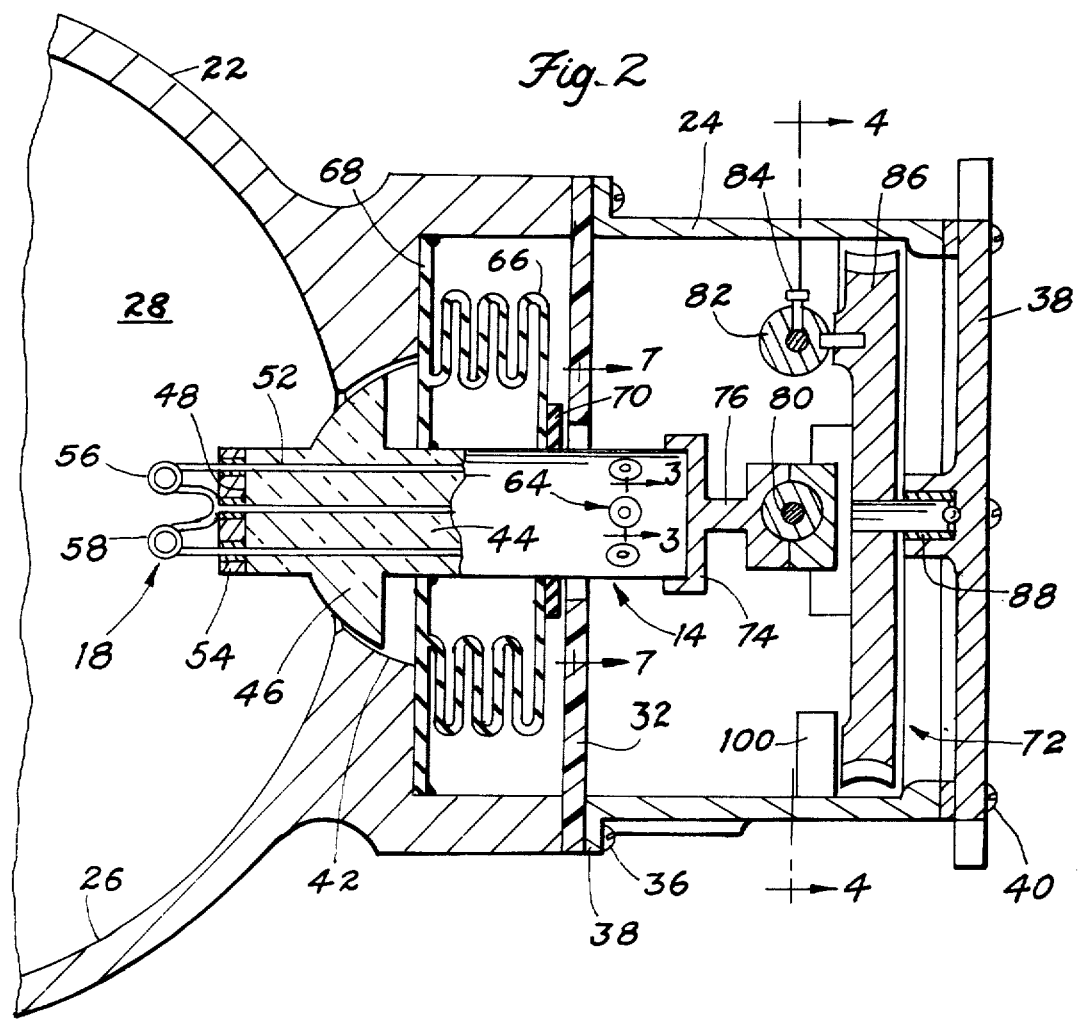

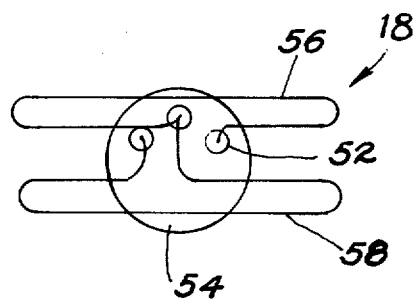
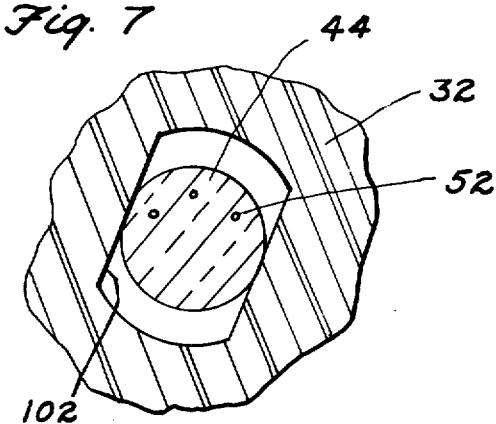
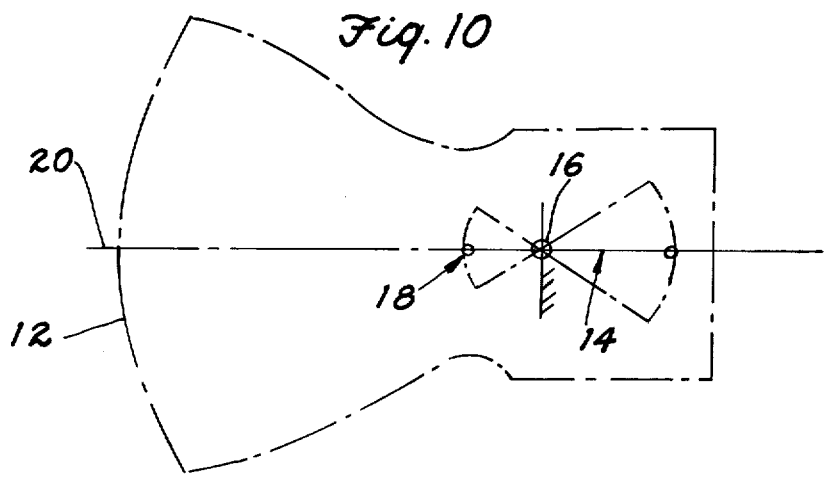
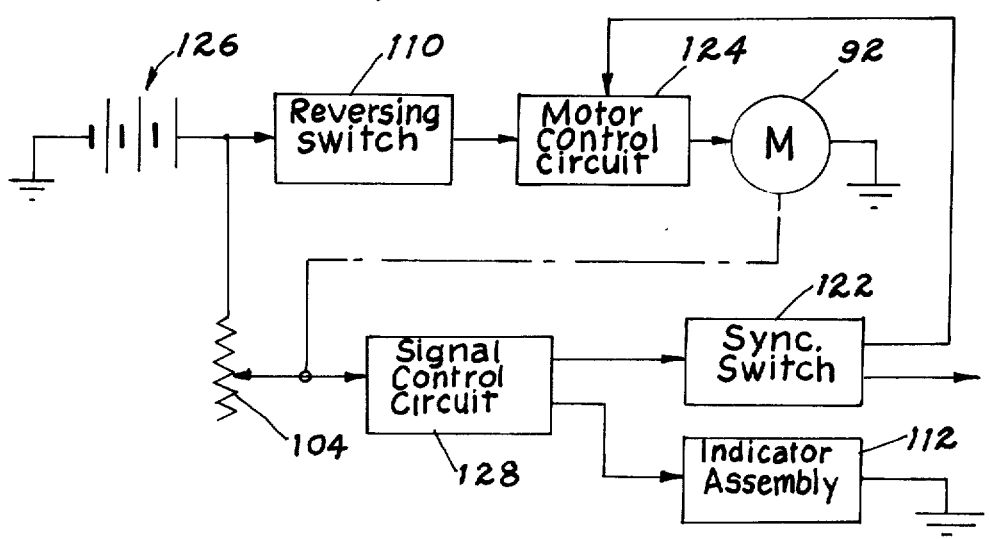

INFINITELY ADJUSTABLE LEVEL LIGHT

BACKGROUND OF THE INVENTION

This invention relates to headlight lamp units of the sealed beam type for automotive vehicles.

Safe operation of automotive vehicles during night time driving often requires changes in the intensity and angular position of the light beams emitted from the headlight lamp units of the vehicle. At the present time, light beam position is adjustable under driver control during vehicle movement between a very limited number of positions. The lamp units must accordingly be mounted in a fixedly adjusted position selected as a compromise in accomodating different road conditions and highway geometry. In view of the advantages associated with the sealing of the lamp filaments in the reflector chamber of the lamp unit, driver controlled adjustment of the filament position has not been seriously considered as a solution to the problem. It is therefore an important object of the present invention to provide for adjustment of filament position within a sealed type lamp unit under driver control in order to meet varying road conditions during night time driving.

In accordance with the present invention, at least two lamp filaments are carried on the forward end of an elongated filament assembly which is pivotally mounted within a lamp unit housing by a spherical bearing. The forward end of the filament assembly is exposed to the inert atmosphere sealed within the reflector chamber by a bellows arrangement to accomodate pivotal displacement of the rear end of the filament assembly by a high reduction gear ratio adjusting mechanism. The angular movement of the adjusting mechanism is measured by an adjustable potentiometer to enable the driver to detect adjustment of the light beam through a dash-mounted indicator assembly. A heat shield protectively separates the sealed reflector chamber of the lamp unit from the operating chamber enclosing the motor driven adjusting mechanism. Pivotal movement of the filament assembly along a plane at an angle to the vertical is guided by a guide slot in the heat shield through which the filament assembly extends. In this fashion, the light beam in its lower level positions is directed laterally toward the curb for illuminating pedestrians.

BRIEF DESCRIPTION OF DRAWING FIGURES

FIG. 1 is a side elevation view of a lamp unit constructed in accordance with the present invention.

FIG. 2 is an enlarged side section view taken substantially through a plane indicated by section line 2—2 in FIG. 1.

FIG. 6 is a front end view of the filament assembly taken substantially through a plane indicated by section line 6—6 in FIG. 2.

FIG. 7 is a partial section view taken substantially through a plane indicated by section line 7—7 in FIG. 2.

FIG. 10 is a schematic illustration diagramming filament assembly adjustment within the lamp unit illustrated in FIG. 1.

FIG. 11 is a simplified block circuit diagram of the control system associated with the present invention.

DETAILED DESCRIPTION OF THE ILLUSTRATED EMBODIMENT

Figure 4:
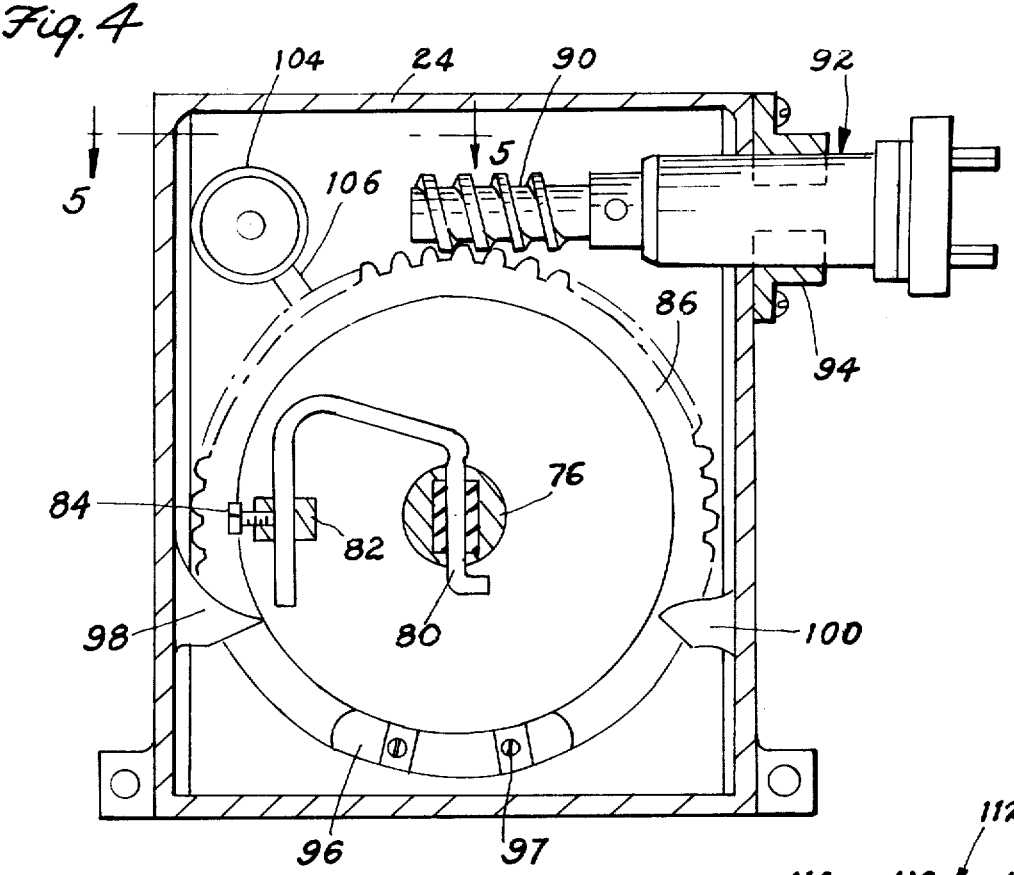
FIG. 4 is a transverse section view taken substantially through a plane indicated by section line 4—4 in FIG. 2.
Figure 5:
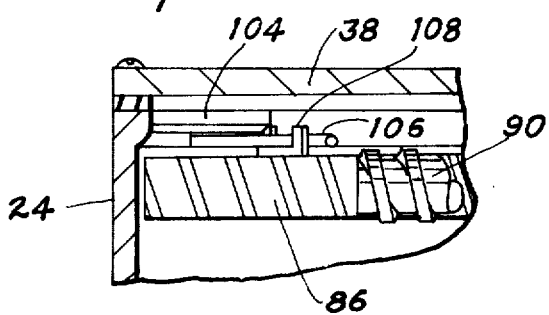
FIG. 5 is a partial top section view taken substantially through a plane indicated by section line 5—5 in FIG. 4.

Referring now to the drawings in detail, FIG. 1 illustrates a sealed headlight lamp unit 10 constructed in accordance with the present invention. A pair of such units are adapted to be mounted at the front end of an automotive vehicle in the usual fashion for projecting light beams forwardly from the front lens face 12 of each unit. As diagrammatically shown in FIG. 10, each unit 10 encloses a movable filament assembly 14 displaceable internally of the unit about a pivot point 16 to adjustably position the filaments 18 at infinitely variable levels. As will be explained hereafter, when the filaments are displaced downwardly along a vertical plane, they are also guided for movement laterally outwardly relative to each other to thereby illuminate zones to the right of the vehicle when the beam level is lowered below the horizontal 20 diagrammed in FIG. 10. By virtue of the foregoing movement, the driver may selectively adjust the light beam level to provide illumination both closer to the vehicle and to its right adjacent the curb for rendering pedestrians visible.

With reference to FIG. 2 in particular, the sealed beam unit 10 encloses the filament assembly 14 within a housing formed by a front section 22 and a rear section 24. The front section 22 is internally formed with a parabolic reflector surface 26 enclosing a sealed reflector chamber 28 about the forward end of the filament assembly 14 on which the filaments 18 are positioned. The front housing section 22 also encloses a chamber 30 rearwardly closed by a plastic heat shield 32 through which the filament assembly projects rearwardly. The heat shield is held assembled between the rear end of housing section 22 and the flange 34 on the front of housing section 24 by a plurality of circumferentially spaced fasteners 36. The rear end of the housing section 24 is closed by a cover 38 that is removably secured to the housing section by fasteners 40 to provide access to the interior of the housing. The aforementioned pivot point 16 is established within the housing by a bearing surface 42 between chambers 28 and 30 in the front housing section 22, the bearing surface 42 being formed as part of a spherical surface having a fixed center of curvature at said pivot point 16 for the filament assembly.

Figure 3:
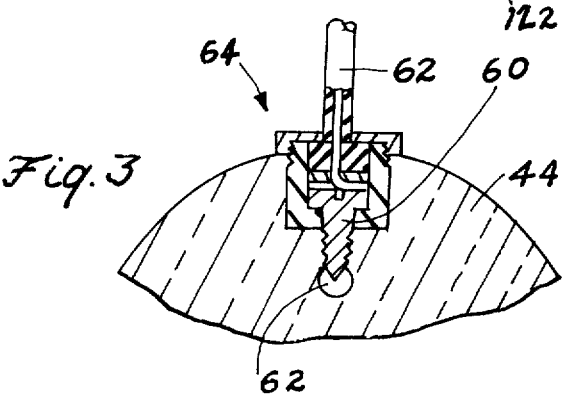
FIG. 3 is an enlarged partial section view taken substantially through a plane indicated by section line 3—3 in FIG. 2.

The filament assembly 14 comprises an axially elongated, cylindrical support member 44 made of an electrically non-conductive and heat resistance material such as "Pyrex" glass. A hemispherical formation 46 is cast integrally with the cylindrical member 44 for bearing support on the bearing surface 42 intermediate the front and rear axial ends 48 and 50 of the member 44. Three insulated conductors 52 extend axially through the member 44 in parallel spaced relation to each other and project from the front end 48 through openings in a brass collar 54 on which the filaments 18 are positioned. The filaments include high and low intensity elements 56 and 58 exposed to the atmosphere within the sealed reflector chamber 28, as shown and interconnected to common ground through the central one of the conductors 52, the other conductors 52 carrying current respectively to the filament elements for alternatively causing incandescence at different levels of brilliance. Each of the conductors 52 terminates in spaced relation to the end 50 of the member 44, and as more clearly seen in FIG. 3, is engaged by a threaded contact 60 for electrical connection thereof to an external conductor 62 by a connector assembly 64. Sufficient slack is provided for the conductors 62 within housing section 24 to accomodate selectively controlled, pivotal movement of the filament assembly.

As shown in FIG. 2, a bellows member 66 is disposed within chamber 30 of the housing section 22 sealed at one axial end to the housing section in surrounding relation to the filament assembly and member 44 thereof by a sealing disc portion 68. The other axial end of the bellows is sealed to the member 44 by sealing collar 70. Thus, the bellows will seal the vacuum established within the illumination chamber 28 housing the filament while accomodating pivotal movement of the filaments assembly in response to displacement of its rear end 50 by a powered adjusting mechanism generally denoted by reference numeral 72 enclosed within housing section 24.

With reference to FIGS. 2 and 4, the rear end 50 of the member 44 is rotatably received within a swivel mount 74 having a shaft section 76 axial aligned with the longitudinal axis of member 44. The shaft section 76 is carried by a connector 78 made of a resilient material such as rubber through which a connecting rod 80 extends along an axis disposed in perpendicular intersecting relation to the aligned axes of shaft section 76 and member 44 on which the pivot point 16 is located. The connecting rod is generally U-shaped as shown in FIG. 4 and is connected in adjustable relation to an actuator member 82 by a set screw 84. The actuator member is eccentrically carried by a worm wheel 86 rotatably mounted within housing section 24 by a bearing 88 carried on cover 38. The worm wheel is enmeshed with a worm gear 90 as shown in FIG. 4. A reversible motor 92 secured by brackets 94 to the housing section 24, projects into the housing and is connected to the worm gear for rotation thereof causing rotation of the worm wheel at a high reduction gear ratio. A resilient arcuate bumper 96 is secured by clamps 97 to a peripheral portion of the worm wheel and is engageable with stop formations 98 and 100 projecting inwardly from the walls of the housing section 24 to limit angular movement imparted to the worm wheel by motor 92 and the corresponding pivotal movement transmitted to the filament assembly 14 through actuator 82, connecting rod 80 and swivel mount 74.

Figure 8:
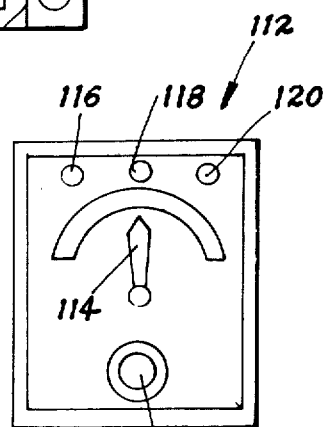
FIG. 8 is a front elevation view of an indicator associated with the invention.
Figure 9:
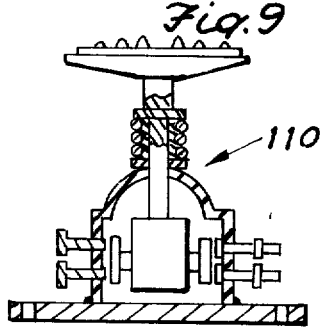
FIG. 9 is a section view through a foot operated, motor control switch associated with the invention.

Pivotal movement of the member 44 is guided along a plane disposed at an angle to the vertical by a slot 102 formed in the heat shield 32 as shown in FIG. 7. The filament assembly in each unit 10 is thereby operative to illuminate a zone laterally offset therefrom when lowered below the horizontal as hereinabove referred to. The vertical level position of the filaments, corresponding to the angular position of the worm wheel 86 is indicated by the setting of an adjustable potentiometer 104 mounted on the cover 38 and having an operating arm 106 engaged by a U-shaped actuator 108 fastened to the confronting side of the worm wheel as shown in FIGS. 2 and 4. The motor 92 is energized under control of a foot-operated switch 110 as shown in FIG. 9 while a dash mounted indicator assembly 112 as shown in FIG. 8 registers the position of the potentiometer operator arm 106 to signify the adjusted position of the filaments. The indicator assembly in the illustrated embodiment includes both an indicator arm 114 and indicator lamps 116, 118 and 120 respectively colored amber, green and red to signify that the filaments are in the lower horizontal or upper positions. A synchronizing switch 122 is mounted on the indicator assembly for maintaining the filaments of both lamp units 10 at the same level. As diagrammatically shown in FIG. 11, a motor control circuit 124 interconnects the vehicle source of electrical energy 126 with the reversible motor 92 through switch 110. Also, a signal control circuit 128 interconnects the potentiometer 104 with the indicator assembly 112 and the synchronizing switch 122 with the motor control circuit in order to perform the function described. Since the design of control circuits to perform the various functions described is within the skill of the art and is not part of the present invention, no circuit details have been described.

In addition to enabling the driver to adjustably project the headlight beams to any distance within the operative range of illumination, the lamp unit as herein before described also provides for two levels of light intensity independent of the angular position of the filament assembly. Thus, the driver may select illumination intensity by suitable switch means to cause incandescence of either filament element 56 and 58.

In adjusting the levels of the light beams, the high reduction gear ratio of the worm gear 90 and worm wheel 86 not only permits a fine adjustment but will also effectively hold the filament assembly in its adjusted position upon de-energization of motor 92 without any brake device. The reduction drive ratio and fine adjustment associated therewith is furthermore increased by location of pivot point 16 closer to the forward end of the filament support member 44 reducing the arc of travel of the filament 18 relative to the rear end 50 of the support member.

I claim:

1. A sealed beam lamp unit comprising a housing having a reflector surface and enclosing an inert atmosphere therein; a filament exposed to said inert atmosphere in said housing; adjustable support means for said filament, means sealingly connecting said support means to said housing for effecting an air tight unit; said support means comprising a member carrying said filament and movable with respect to said housing to selected positions to orient said filament for emitting illumination at predetermined reflected beam angles; and actuating means operatively connected to said movable support member for displacement to said selected positions.

2. The combination of claim 1, including indicator means operatively connected to the actuating means for indicating said selected positions of the filament.

3. The combination of claim 2, including guide means mounted by the housing and engageable with the support member for guiding pivotal movement thereof along a plane disposed at an angle to the vertical.

4. The combination of claim 3, wherein said guide means includes a guide slot formed in the heat shield through which the support member extends.

5. The combination of claim 4, wherein said sealing means includes bellows means connected to the housing and the support means for sealing the housing.

6. The combination of claim 5, wherein said support member is made of a heat resistant material and having opposite axial ends respectively disposed internally of and externally of the housing, a plurality of electrical conductors extending through the support member, said filament being carried on the internal one of said ends of the support member and connected to the conductors, and connector means mounted on the support member in spaced relation to the other end thereof externally of the housing for conducting electrical energy to the conductors from an external source to render the filament incandescent.

7. The combination of claim 6, including a bearing surface having a fixed center of curvature within the housing and a hemispherical formation projecting externally from the support member in bearing relation to said bearing surface, said support member having a longitudinal axis on which said center of curvature lies to form a universal pivot point for the filament.

8. The combination of claim 7, wherein the actuating means includes reduction gear means, connecting means rotatably mounted on the support member adjacent said other end thereof, means drivingly connecting the gear means to the connecting means for pivotal displacement of the support member through a predetermined arc, and means for limiting movement of the gear means.

9. The combination of claim 1, including guide means mounted by the housing and engageable with the support means for guiding pivotal movement thereof along a plane disposed at an angle to the vertical.

10. The combination of claim 9, including a heat shield separating the housing from the actuating means.

11. The combination of claim 9, wherein said guide means includes a guide slot formed in the heat shield through which the filament assembly extends.

12. The combination of claim 1 wherein said sealing means includes bellows means connected to the housing and the support means for sealing the housing.

13. The combination of claim 1 wherein said support member is made of a heat resistant material and having opposite axial ends respectively disposed internally of and externally of the housing, a plurality of electrical conductors extending through the support member, said filament being carried on the internal one of said ends of the support member and connected to the conductors, and connector means mounted on the support member in spaced relation to the other end thereof externally of the housing for conducting electrical energy to the conductors from an external source to render the filament incandescent.

14. The combination of claim 1, including a bearing surface having a fixed center of curvature within the housing and a hemispherical formation projecting externally from the support member in bearing relation to said bearing surface, said support member having a longitudinal axis on which said center of curvature lies to form a universal pivot point for the filament.

15. The combination of claim 1, the actuating means includes reduction gear means, connecting means rotatably mounted on the support member adjacent said other end thereof, actuator means drivingly connecting the gear means to the connecting means for pivotal displacement of the support member through a predetermined arc, and means for limiting movement of the gear means.

* * * * *